Sept. 20, 1932.  D. C. SCOTT  1,878,192
TESTING MACHINE
Filed Feb. 8, 1927
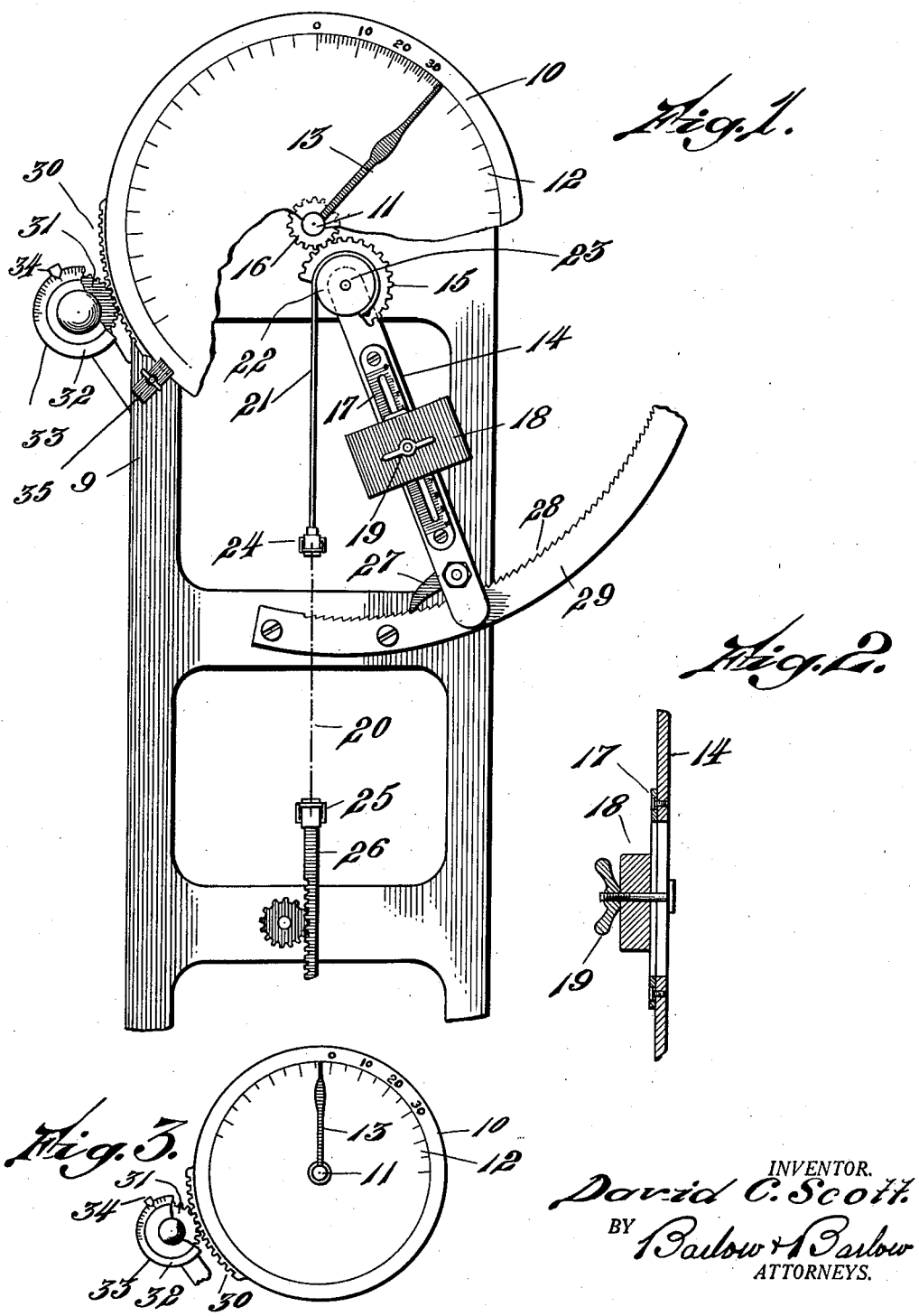
INVENTOR.
David C. Scott.
BY Barlow & Barlow
ATTORNEYS.

Patented Sept. 20, 1932

1,878,192

UNITED STATES PATENT OFFICE

DAVID C. SCOTT, OF PROVIDENCE, RHODE ISLAND, ASSIGNOR TO HENRY L. SCOTT COMPANY, OF PROVIDENCE, RHODE ISLAND, A CORPORATION OF RHODE ISLAND

TESTING MACHINE

Application filed February 8, 1927. Serial No. 166,692.

This invention relates to improvements in tensile strength testing machines; and has for its object to provide in such a machine means for adjusting the mechanism thereof to affect the reading of the recording or indicating dial or unit to compensate for the gain or loss in strength of the specimen being tested due to quantity of moisture contained in the specimen as computed from an adopted standard.

With these and other objects in view, the invention consists of certain novel features of construction, as will be more fully described, and particularly pointed out in the appended claims.

In the accompanying drawing:

Figure 1 is a front view of my improved tensile strength testing machine showing the mechanism which is adapted to be adjusted to affect the reading of the recording dial to read in terms of an adopted testing standard.

Figure 2 is a fragmental view of the weight arm showing one means for securing the weight in adjusted position with the arm over the indicating scale.

Figure 3 shows means for adjusting the dial relative to the pointer and shows it as advanced to compensate for gain in strength of the specimen being tested.

It is a well known fact that cotton is hygroscopic to a marked degree, gathering to itself automatically a large percentage of its weight when dry in the form of moisture. The effect of this "regain" upon its tensile strength is very pronounced. Heavy fabrics of cotton, such as tire, hose, and belting ducks are found to gain approximately 7 percent of moisture. From the above it will be seen that if fabrics are tested without regard to moisture conditions or content at the time of testing the results are apt to vary so widely that but little real knowledge of the strength or character of the fabrics will be gained.

Various methods may be employed for testing textiles, one being when the textile is in a so called "bonedry" or perfectly dry condition; a second, under standard atmospheric conditions at maximum regain over a "bonedry" condition; and a third, under prevailing atmospheric conditions with the results corrected for the actual moisture present in the specimen at the time of the test. For practical purposes this third method of testing appears to be the best and to accomplish this in a simple and practical way, I have produced a tensile strength testing machine which is constructed to permit of such adjustment either of its weights or tension resisting mechanism or of its dial or pounds pull indicating device or both the weight and the dial so as to effect and correct the reading of this instrument to compensate for the gain or loss in strength of the specimen being tested due to the amount of moisture contained in the specimen at the time of testing.

For instance, the machine employed may be normally set to test certain cotton fabrics under a certain adopted standard of moisture content, say for instance 6½% above the "bonedry" condition, and when employed to test a specimen whose moisture content is known to vary from that standard the weight on the machine may be adjusted to compensate for the change in strength of the specimen so as to cause the dial to read in terms of the adopted standard; that is, if the specimen contained more moisture than the adopted standard its strength would be increased a definite amount over said standard according to its character, and the weight would be lowered on its arm to the indicated point on the scale exerting a greater actual pull on the specimen than that indicated on the dial, and if the specimen contained less than the adopted standard the resistance would be correspondingly reduced to correct the dial reading; and the following is a detailed description of one embodiment of my invention showing a number of different arrangements of elements so arranged on my improved machine so as to accomplish these advantageous results:

In the present machine herein illustrated, the dial 10 may be rotatably mounted on the central pivot 11 supported on the frame 9, the dial being graduated on its face as at 12 to indicate in pounds pull or other unit of measure the breaking strength of the specimen being tested and over this dial face swings the indicating hand 13 arranged to be moved over this dial by the swinging movement of the weight arm 14 through the segment 15 and pinion 16. On this weight arm is fixed the graduated scale 17 over which the tension resisting weight 18 may be moved and locked in any desired adjusted position by the thumb nut 19, said graduation being arranged to indicate a compensation for the varying strength of the specimen being tested. One way of connecting the specimen 20 to be tested to the weight arm, is through the flexible member 21 that passes over the drum 22 fixed to said arm at its pivoting point 23. This member is provided with a clamp 24 at its free end for gripping one end of the specimen while the clamp 25 connects the opposite end of the specimen to the tensioning member 26.

As tension is applied to the specimen the weight arm 14 swings outwardly on an arc of a circle and when the specimen breaks the pawl 27 carried by this arm engages the teeth 28 on the rack 29 to prevent the arm from immediately returning after the specimen has been ruptured, thereby permitting careful reading of the dial 10.

It will be noted that the adjustability of this weight 18 permits it to be readily raised or lowered on its arm 14 so as to compensate for the change in strength in the specimen due to difference in its moisture content and thus cause the dial to read in terms of the adopted standard.

In some instances instead of moving the weight to compensate for difference in strength of the specimen being tested, I have provided means for adjusting the dial 10 to perform substantially this same function. To compensate thus, I have provided a rack 30 on the dial and have mounted a pinion 31 in mesh with the rack, connected an operating handle 32 to the shaft of this pinion 31 and graduated the edge 33 of this handle so that it may be moved with reference to the pointer 34, whereby the amount of adjustment necessary to compensate for the difference in strength of the specimen due to its moisture content may be readily set. I have also shown a clamp 35 for the disc by which it may be secured in any set position. In other words, I have herein shown a tensile strength testing machine, the tension resisting weight of which may be adjusted to compensate for gain or loss in the strength of the specimen being tested so as to cause the dial to read correctly. I have also shown mechanism whereby the dial itself may be adjusted to compensate in its reading for the difference in the strength of the specimen due to its moisture content.

My mechanism for accomplishing this purpose is extremely simple and practical in construction and is effective in operation as by its use it is only necessary to first ascertain the degree of moisture content in the specimen about to be tested and then adjust the machine either by regulating its weight or by a movement of its dial to compensate for the gain or loss in the strength of the material over the adopted testing standard.

The foregoing description is directed solely towards the construction illustrated, but I desire it to be understood that I reserve the privilege of resorting to all the mechanical changes to which the device is susceptible, the invention being defined and limited only by the terms of the appended claims.

1. In the fabric tensile strength testing machine, jaw members to hold the material under test, a weighted lever connected to one of said jaw members, an indicator having relatively movable parts, means operatively connecting said lever to one of said indicator parts and means for relatively adjusting said indicator parts whereby the reading thereof may be changed to compensate for moisture content variation in the test specimen.

2. In a fabric tensile strength testing machine, jaw members to hold the material under test, a weighted lever to which one jaw member is connected, an indicating device, means for changing the indication on said indicating device upon movement of said weighted lever, and means for varying the setting of the indicating device to compensate for moisture content variation of the test piece.

3. In a fabric tensile strength testing machine, jaw members to hold the material under test, a weighted lever to which one jaw member is connected, an indicating device comprising a relatively movable dial and pointer, means for moving said dial and pointer relatively to each other upon movement of said weighted lever, and means for changing the relative positions of said dial and pointer to compensate for moisture content variation of the test piece.

4. In a fabric tensile strength testing machine, jaw members to hold the material under test, a weighted lever to which one jaw member is connected, an indicating device comprising a dial and a pointer movable with respect thereto, means for moving said pointer upon movement of said weighted lever, and means for setting the dial to compensate for moisture content variation of the test piece.

5. In a machine for testing the tensile strength of fabrics, tension means for holding the specimen under test, an indicating device having movable elements, means responsive to the tension applied by said tension means to the specimen for moving one of said indicating elements to change the reading of said indicating device, and means for adjusting the other of said elements a predetermined amount to compensate for variation of the moisture content of the specimen.

6. In a machine for testing the tensile strength of fabrics, tension means for holding the specimen under test, an indicating device having relatively movable elements, means responsive to the tension applied by said tension means to the specimen for moving one of said elements to change the reading of said indicating device, and manually adjustable means for adjusting the other of said elements a predetermined amount to compensate for variation in moisture content of the specimen.

7. In a machine for testing the tensile strength of fabrics, means for applying tension to the material specimen under test, an indicator having relatively movable parts, means responsive to the tension applied by said tension means to the specimen for relatively moving the indicator parts to change the reading thereof, and means for relatively adjusting the indicator parts by a predetermined amount to compensate for variation in moisture content of the specimen.

In testimony whereof I affix my signature.

DAVID C. SCOTT.